United States Patent
Shitara

(10) Patent No.: US 10,870,948 B2
(45) Date of Patent: Dec. 22, 2020

(54) METHOD OF MEASURING THICKNESS OF LONG SHEET MATERIAL AND THICKNESS MEASURING SYSTEM

(71) Applicants: PSM INTERNATIONAL, INC., Tokyo (JP); PROCEMEX OY, Jyskae (FI)

(72) Inventor: Hisataka Shitara, Tokyo (JP)

(73) Assignees: PSM INTERNATIONAL, INC., Tokyo (JP); PROCEMEX OY, Jyskae (FI)

( * ) Notice: Subject to any disclaimer, the term of this patent is extended or adjusted under 35 U.S.C. 154(b) by 96 days.

(21) Appl. No.: 16/092,648

(22) PCT Filed: Feb. 22, 2017

(86) PCT No.: PCT/JP2017/006487
§ 371 (c)(1),
(2) Date: Oct. 10, 2018

(87) PCT Pub. No.: WO2017/179302
PCT Pub. Date: Oct. 19, 2017

(65) Prior Publication Data
US 2019/0153672 A1  May 23, 2019

(30) Foreign Application Priority Data

Apr. 11, 2016 (JP) .................................. 2016-078675

(51) Int. Cl.
| | | |
|---|---|---|
| *D21F 7/06* | (2006.01) | |
| *G01B 11/08* | (2006.01) | |
| *G01B 21/08* | (2006.01) | |
| *G01B 11/06* | (2006.01) | |

(52) U.S. Cl.
CPC ................ *D21F 7/06* (2013.01); *G01B 11/06* (2013.01); *G01B 11/08* (2013.01); *G01B 21/08* (2013.01)

(58) Field of Classification Search
USPC ........................................................ 162/198
See application file for complete search history.

(56) References Cited

U.S. PATENT DOCUMENTS

| | | | |
|---|---|---|---|
| 2,356,660 | A | 8/1944 | Deuel, Jr. et al. |
| 6,494,399 | B1 | 12/2002 | Rautakorpi |
| 2007/0176040 | A1 | 8/2007 | Asikainen et al. |
| 2015/0034757 | A1 | 2/2015 | Bixler et al. |

FOREIGN PATENT DOCUMENTS

| | | |
|---|---|---|
| CN | 1202868 A | 12/1998 |
| CN | 1741946 A | 3/2006 |
| CN | 102607494 A | 7/2012 |
| FI | 20040510 A | 10/2005 |
| JP | 56-51606 A | 5/1981 |
| JP | S5651606 A | 5/1981 |
| JP | S5716994 A | 1/1982 |
| JP | 1-98550 A | 4/1989 |
| JP | 11-351832 A | 12/1999 |
| JP | 2002181524 A | 6/2002 |
| JP | 2004-277899 A | 10/2004 |
| JP | 2005-134342 A | 5/2005 |
| WO | WO2015015348 A1 | 2/2015 |

OTHER PUBLICATIONS

JPS-5651606, Nomoto Akira, JUJO Paper Co., machine translation, Sep. 1981.*
Extended European Search Report cited in corresponding European Appln. No. 177821204 dated Nov. 19, 2019.
First Chinese Office Action in corresponding Chinese Patent Appln. No. 201780023003.9 dated Jan. 19, 2020.
Zhong Fei, Zhang Changham, Li Junwei (2010); "The Design of Sheet Thickness Detection System of High Precision"; Packaging Journal vol. 2, No. 2, Apr. 2010; pp. 32-35.
International Search Report in corresponding International Application No. PCT/JP2017/006487, dated May 16, 2017.

* cited by examiner

*Primary Examiner* — Mark Halpern
(74) *Attorney, Agent, or Firm* — Bacon & Thomas, PLLC

(57) ABSTRACT

A method of measuring the thickness of long sheet material wound on to a reel spool while being pressed by a reel drum, includes: measuring the increase in the roll diameter of the wound roll formed from the long sheet material in a non-contact manner; measuring the number of rotations of the reel spool; and determining the thickness of the long sheet material by calculation using the measured increase in the roll diameter and the number of rotations.

4 Claims, 11 Drawing Sheets

FIG. 7 A
FIG. 7 B
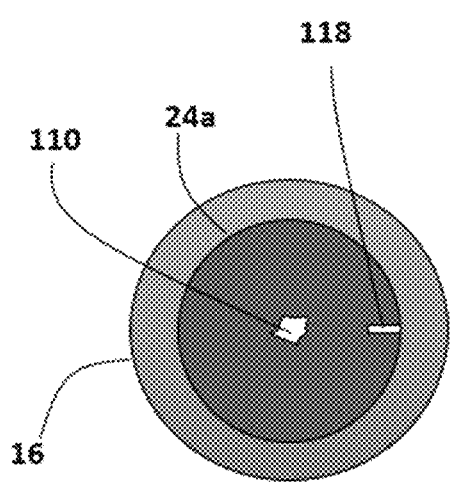
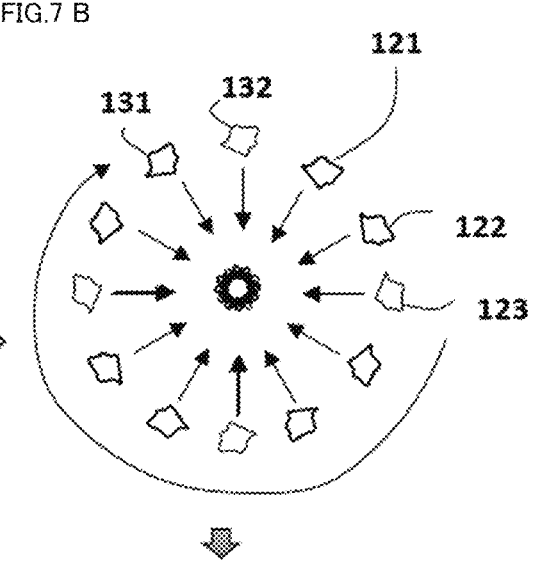
FIG. 7 D
FIG. 7 C
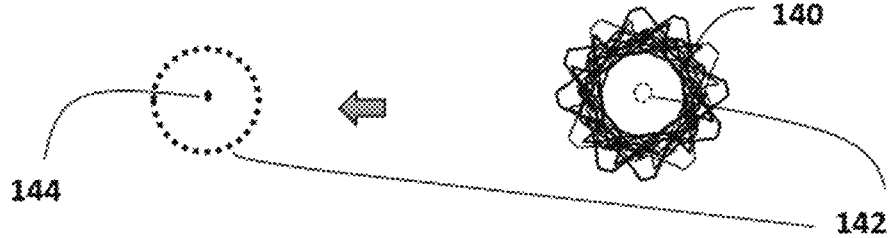

$$h = \sqrt{(r0+y)^2 + x^2} - r0$$

METHOD OF MEASURING THICKNESS OF LONG SHEET MATERIAL AND THICKNESS MEASURING SYSTEM

This application is a 371 of PCT/JP2017/006487 filed 22 Feb. 2017

TECHNICAL FIELD

The present invention relates to a method of measuring the thickness of a long sheet material such as a paper web (roll of paper) manufactured in a paper machine or the like, plastic film, and so on, and a system therefor.

BACKGROUND ART

The paper property quality control system of paper machines that manufacture various grades of paper with widths ranging from 1 m to 10 m and manufacturing speed ranging from several meters to 2000 m per minute is almost all housed in a sensor head mounted on a device referred to as a scanner, to measure the paper weight (basis weight), percentage moisture, thickness (caliper), percentage ash, and so on. The property quality control system is installed immediately before a winder configured from a reel drum and a reel spool, as shown in the common paper machine in FIG. 14 and the paper machine disclosed in PTL 1, and is used for the control criteria for manufacture. Depending on the process, a scanning sensor may be installed also before applying a coating to the surface of the paper. These paper quality parameters can be controlled: in the machine direction (direction normal to the width of the paper), the basis weight, the percentage moisture, and the percentage ash can be controlled, and in the cross direction the profiles (irregularity or flatness along the width direction of the paper) of the basis weight, percentage moisture, and thickness can be controlled. FIG. 15 shows the sensor head carrying out sampling measurements by scanning the paper that is being manufactured at high speed in the paper machine.

The final thickness of a long material such as paper web or the like produced in a paper machine is measured immediately before being wound on a reel spool. The grades of paper used include news print, fine paper, coated paper, medium quality paper, and so on. Methods of measurement that have been developed include magnetic reluctance, laser triangulation, optical (confocal-displacement) method, and other distance to thickness (caliper) conversion methods, and typically the measurements are carried out by a sensor head mounted in a device referred to as a scanner that moves in the width direction over the sheet.

In this sampling method by scanning, fluctuations in quality parameters due to millimeter size fluctuation factors in paper known as paper formation, fluctuation in quality parameters due to randomly occurring washing shower problems in the width direction, and web wander/web shrinkage, and fluctuations in quality parameters due to defects (external disturbances) of the equipment in the paper machine rotating at high speed, namely the wire, press roll, felt, canvas, and so on from several meters to several tens of meters are measured as noise. A measured representative value is calculated after the noise is removed by methods of smoothing out the measurement values known as filtering. The average measurement values over the whole width or the profile in the width direction is represented using this processed data, a difference from the target control values is calculated, and the quality parameters are controlled and corrected using a device known as an actuator.

These controls are carried out by a device referred to as an actuator that is separate from the machine. Normally as for the control in the machine direction, the concentration of the input fiber is adjusted by stock valve control, and the percentage moisture, the drying state, is controlled by vapor pressure control of the dryer. In the width direction, the basis weight is controlled by adding dilution water to adjust the concentration when discharged from the head box, percentage moisture is controlled by re-wetting or re-moisturizing or drying by steam heating or drying by IR heater, and the thickness (caliper) is controlled by changing the calendar roll diameter by heating or cooling on the roll surface that makes the nip, and in this way parameters are controlled to their target values.

Replacement of the reel spool of the winder in a paper machine is an important operation, referred to as reel turn up, and when the paper has reached a certain length the operator cuts the paper so that the paper is wound on to the next reel spool. Typically the timing of reel turn up is determined visually when the end of a secondary arm supporting the reel spool overlaps with a reel turn up target mark (for example symbol 30 in FIG. 1) on a rail on which the reel spool moves.

CITATION LIST

Patent Literature

[PTL 1] Japanese Unexamined Patent Application Publication No. 2004-277899

SUMMARY OF INVENTION

Technical Problem

However in the paper machine as shown in FIG. 14 or as disclosed in PTL 1, the measurement values are obtained by scanning transversely at an incline the paper as it travels at high speed, so the measurement values include both a component in the width direction and a component in the machine direction, and heavy filtration is applied to the measurement values in order to separate the components. Therefore this has the major problem that when the operator has adjusted the machine for control of the quality parameters, the result cannot be seen until after a wait of more than 10 minutes. FIG. 16 shows how a step response is displayed when filtering quality parameters during the papermaking process using the moving average method and the exponential filtering method.

Also, the wound product (paper) can vary from several thousand meters to several tens of thousands of meters, from thick to thin, and typically it takes about one hour to produce one roll. At this time if the average measured values of the quality parameters of each wound roll are compared, it is found that the values are contained within a comparatively small tolerance range, and at a glance it appears that good measurement control is being carried out, but typically within the several thousand meters in one roll variations ranging from ±1% to several percent are included, and at the level of the smaller units that the customer actually uses, for example photocopy paper (referred to as sheets) this cannot be said to be the result of good control. The result is sheet break and/or sheet jamming in printing machines or photocopy machines.

In addition, at present typically a Quality Control System (QCS) is used for measuring and controlling paper quality, and for measurement of basis weight $(g/m^2)$, which is the basic parameter, a radioisotope source such as Kr85 or Pm147 is necessary, a permit must be obtained for their use, and radiation control personnel are required. The actual β-ray basis weight measurement system is affected by the mass of the air and several corrections are necessary, and maintenance in order to maintain accuracy is a significant burden. Therefore at present this kind of measurement control is still not carried out on the small paper machines of small and medium-sized companies. Also, for very thin tissue paper and also heavy board paper, because of limitations in correction for β-ray sources and the difficulty of determining the percentage moisture, the aim is condition monitoring, and absolute paper property measurement control is not acceptable level.

In addition, thickness sensors cannot be used for board paper where recycled paper is frequently used, because of adhesion of pitch (tar) on the sensors, and for light weight paper such as tissue paper, because of tearing of paper. Because the important quality parameter of thickness cannot be measured on tissue paper or heavy board paper, there is large variation in the quality produced.

The currently used measurement methods as described above are all successive sampling measurements by sensors mounted on a scanner, and with this method both machine direction and width direction (cross direction) variances are included in measurement values. Also, even with a short measurement time of 1 millisecond, if the sensor requires 20 to 30 seconds to cross the web on a paper machine of 6 m width for example, for paper machines with speeds in excess of 1000 m per minute, only 0.2% or less of the web would be measured.

In the case of the above described filtering in order to reduce the external disturbances, assuming the commonly used suppression value of 0.2 for exponential filtering of a step response, 10 scans are required for 98% response, 6 scans for 90% response, and 3 scans for 63% response. When this is added to machine delay it requires several minutes, and controllability is more than double that, or more than 10 minutes, and in the case of paper machines with large external disturbances the control factors are more stringent so several tens of minutes are required. Therefore short period external disturbances, in other words fluctuations due to the paper machine equipment, are filtered out and are not seen by the operator, and as a result if the comparatively long period winding level average values match the target values, it is considered acceptable.

This is producing a consistent finish while external actuators are forcibly applying load on the paper, but without understanding what is causing the error in measurement values. At certain times this can cause an external disturbance to another sensor, which has an adverse effect in terms of feedback control theory. This is inevitable with the current technology, because even if the cause of the error might be a fault in the paper machine equipment, in other words a washing shower problem, eccentricity of the winding roll, bias, and so on, the error is filtered and it is not possible to carry out high-speed measurement.

The timing of sheet cutting for reel turn up is determined by the radius (diameter) of the wound roll for each grade produced, and very few paper machines do reel turn up at the actual accurate length. In length meters, typically observed slip occurs between the roll and the paper being measured, and this value is about 0.3% to 0.5%, which amounts to 150 m to 250 m in a total length of 50,000 m in a paper machine. Assuming the thickness of the paper is 200µ, an error of 1 mm corresponds to an error of 50 m in the length. In addition to the variation in the quality as described above, this excess length cannot be resolved by the current methods.

It is an object of the present invention to provide a method of measuring the thickness of long sheet material and a thickness measuring system, that does not carry out the scanning type successive sampling as described above, that measures the thickness (referred to as caliper) of paper separately in the machine direction and the cross direction, that does not require a conventional basis weight sensor using a radioisotope, that does not carry out scanning or filtering, that can be applied even to small paper machines, and that has high economic effect.

Solution to Problem

The method of measuring the thickness of long sheet material according to the present invention (1) is a method of measuring thickness of a long sheet material wound on to a reel spool while being pressed by a reel drum, and includes measuring the increase in the roll diameter of a wound roll formed from the long sheet material in a non-contact manner, measuring the number of rotations of the reel spool, and determining the thickness of the long sheet material by calculation using the measured increase in roll diameter and the number of rotations.

As the long sheet material is wound on to the reel spool the roll diameter (radius) of the wound roll increases. By dividing the increase in the roll diameter in a certain period of time by the number of rotations of the reel spool within that same period of time, it is possible to obtain the average thickness of the long sheet material wound onto the winding roll in that period of time. Measurement is carried out in a non-contact manner (for example based on images taken by a camera), so flaws or the like are not placed on the long sheet material. For processes where conventionally it is difficult to introduce non-contact type thickness measurement, it is not necessary to substitute mass measurement using radioactivity for the thickness measurement. Therefore this new concept of measurement method has high economic effect and also it can be applied to small paper machines.

Long sheet material is wound while being pressed by the reel drum, so the thickness obtained continues the concept of measurement under a pressure of 50 kPa in accordance with the TAPPI (Technical Association of the Pulp & Paper Industry), so more accurate thickness measurement of long sheet material is obtained.

Also, the total length of the wound long sheet material can be measured from the perimeter length and the number of rotations, by calculating the perimeter length of the wound roll in one rotation using the increase in roll diameter in a certain period of time from the reel spool diameter and the number of rotations of the reel spool in the same period of time. This results in an increase in the accuracy of timing of reel turn up that conventionally relies on visual judgment, and a major economic effect of reduction in loss of sheet material.

In the method of measuring the thickness of long sheet material according to the present invention (2), preferably the position of the reel drum is fixed, and the reel spool is movable relative to the reel drum in the machine direction in accordance with the increase in the roll diameter, and the amount of movement in the machine direction of an end surface of the reel spool is measured as the amount of increase in the roll diameter.

The machine direction referred to here is the direction of winding of the long sheet material (the direction normal to the width direction that is discussed later).

As the long sheet material is wound onto the reel spool and the roll diameter of the wound roll increases, the position of the reel spool moves away from the reel drum in the diametral direction, in other words in the machine direction. Therefore, if the amount of movement in a certain period of time of the position of the end surface of the reel spool in the machine direction is measured, the amount of increase in the roll diameter in that period of time is measured. From the amount of movement of the end surface of the reel spool, in other words the amount of increase in the roll diameter, and the number of rotations of the reel spool in the same period of time, the average thickness of the long sheet material wound in that period of time can be obtained.

The thickness measurement can be carried out from the end surface side of the reel spool (or the wound roll), so the long sheet material can move smoothly to the downstream process without hindrance to movement in the machine direction.

In the method of measuring the thickness of long sheet material according to the present invention (3), line laser light having length in a cross direction of the wound roll may be irradiated onto the surface of the wound roll, images of the line laser light irradiated on the surface of the wound roll may be taken from a different angle than the direction of irradiation of the line laser light, and the amount of increase in a cross direction roll diameter of the wound roll may be measured based on the images of the line laser light that are taken, and the amount of increase may be taken to be the amount of increase in the diameter of the roll.

Here the cross direction refers to the width direction of the long sheet material. The cross direction roll diameter refers to the roll diameter at each point in the cross direction of the long sheet material. This reflects the profile in the cross direction of the long sheet material (irregularity or flatness of the thickness along the cross direction).

As the roll diameter increases the point of focus of the linear laser light irradiated on to the wound roll shifts and the distance from the light source varies, so if a camera takes an image twice using a specific time interval in the same field of view, for example, not only the position within the field of view but also the thickness and the length will vary between the first image and the second image. As shown in FIG. 9A, on the image irradiated with a line laser light source when the height of the wound roll is low (when the distance from the camera is far), the focal point is slightly shifted as in the laser light image 262, so a thick long image appears on the upper side in the field of view. The laser light image 264 is a sharp image at the set focused central position, the length is shorter than the laser light image 262, and the position within the field of view is exactly in the center point. When the roll diameter increases and the distance to the camera becomes shorter, the image appears on the lower side in the field of view as indicated by laser light image 266, and the resulting image is thicker as it has shifted from the focal point and the length is shorter. Also, if there is irregularity in the roll diameter along the width direction (if the cross direction roll diameter is not uniform), the image is not a straight line, as indicated by the laser light image 260 in FIG. 9B. From these changes in the images, the amount of increase in the cross direction roll diameter in that period of time at each point can be obtained over the whole width at once.

From the increase in the cross direction roll diameter within a certain period of time, and the number of rotations of the reel spool in that same period of time, the average cross direction roll diameter (profile) of the long sheet material wound within that period of time can be obtained over the whole width at once.

Every time one image is taken, if for example while the reel spool is making 1 rotation an image of from several tens of points to several hundreds of points is acquired, it is possible to average the measurement values of the cross direction roll diameter obtained from these images, and fine noise can be eliminated.

The system for measuring the thickness of long sheet material (thickness measurement equipment) according to the present invention is a system for measuring thickness of a long sheet material wound on to a reel spool while being pressed by a reel drum, that includes:

roll diameter measurement equipment configured to measure the increase in the roll diameter of a wound roll formed from the long sheet material in a non-contact manner;

rotation measurement equipment configured to measure the number of rotations of the reel spool; and measurement and control equipment configured to calculate by using the increase in the roll diameter measured by the roll diameter measurement equipment and the number of rotations measured by the rotation measurement equipment.

This thickness measurement system implements the thickness measurement method (1) described above, and can measure the thickness of the long sheet material.

The roll diameter measurement equipment measures the increase in the roll diameter (or the amount of increase from the reel spool diameter) in a certain period of time. The rotation measurement equipment measures the number of rotations of the reel spool within the same period of time. The measurement and control equipment obtains the average thickness of the long sheet material wound onto the wound roll in that period of time by calculation based on the measured increase in the roll diameter and the number of rotations of the reel spool. The measurement and control equipment can also measure the total length of the wound long sheet material from the perimeter length and the number of rotations, by calculating the perimeter length of the wound roll in one rotation based on the increase in roll diameter in a certain period of time from the reel spool diameter and the number of rotations of the reel spool in the same period of time.

In the system for measuring the thickness of long sheet material according to the present invention, preferably the position of the reel drum is fixed, and the reel spool is movable relative to the reel drum in the machine direction in accordance with the increase in the roll diameter, and the roll diameter measurement equipment is machine direction distance measurement equipment configured to measure the amount of movement in the machine direction of an end surface of the reel spool.

This thickness measurement system implements the thickness measurement method (2) described above, and can measure the thickness of the long sheet material.

The machine direction distance measurement equipment measures the amount of movement in the machine direction of the position of an end surface of the reel spool (or the amount relative to the position of the reel drum) within a certain period of time. The reel drum is fixed, so this amount can be taken to be the amount of increase of the roll diameter within that period of time.

The machine direction distance measurement equipment can be installed on the reel spool end surface side, so the wound roll can be moved in the machine direction, in other words to the downstream process, without interference.

Further, in the system for measuring the thickness of long sheet material according to the present invention, preferably the machine direction distance measurement equipment includes a machine direction camera configured to take an image of an end surface of the reel spool during rotation, and machine direction image processing equipment configured to measure the amount of movement in the machine direction of the end surface of the reel spool based on the image taken by the machine direction camera.

Such a thickness measurement system can measure the thickness of the long sheet material with high accuracy. By taking two images of the end surface of the reel spool during rotation with the machine direction camera within the same field of view, and measuring the deviation between the two images taken using the machine direction image processing equipment, it is possible to obtain the amount of movement in the machine direction of the end surface of the reel spool during the time period from the time when the first image was taken to the time when the second image was taken. If the number of rotations of the reel spool is measured by the rotation measurement equipment within the same period of time, it is possible to obtain the average thickness of the long sheet material wound within that period of time by calculation by the measurement and control equipment.

It is considered that in order to improve the measurement accuracy for the amount of movement, for example several tens of images should be captured during one rotation of the reel spool for one image taking, and the centroid of the image should be calculated by the machine direction image processing equipment. In this case, it is possible to obtain the amount of movement as a result from which errors caused by vibrations associated with rotation of the reel spool and deviations in the lateral direction have been removed. By obtaining the centroid of the multiple images, it is possible to measure the amount of increase of the roll diameter of the wound roll to an accuracy of several tens of μm or better.

A center mark may be provided in advance in the center of the end surface of the reel spool, and images of this mark may be taken. In this case also, by obtaining the centroid of the multiple images by calculation, it is possible to measure the amount of movement in the machine direction of the center position of the end surface of the reel spool, in other words the amount of increase of the roll diameter of the wound roll, as a result in which errors caused by deformation or blurring of the center mark and so on have been removed.

In the system for measuring the thickness of long sheet material according to the present invention, the roll diameter measurement equipment may include cross direction roll diameter measurement equipment that includes:

a line laser light source disposed so as to irradiate the surface of the wound roll with line laser light having length in the cross direction of the wound roll;

a cross direction camera configured to take an image of the line laser light irradiated on the surface of the wound roll from the line laser light source from a different angle than the direction of irradiation; and cross direction image processing equipment configured to measure the amount of increase in the cross direction roll diameter of the wound roll based on the line laser light images taken by the cross direction camera.

This thickness measurement system implements the thickness measurement method (3) described above. Preferably the line laser light source and the cross direction camera cover the full width of the wound roll, and for this purpose a plurality of each may be disposed.

For example, from an image taken by the cross direction camera at the position when the focal point of the line laser light from the line laser light source coincides with the surface of the wound roll, the cross direction roll diameter as a reference value can be obtained by the cross direction image processing equipment (if the focal point coincides with the surface of the reel spool, the reference value can be obtained as an absolute value). After a certain period of time or after a certain number of rotations, an image of the line laser light on the surface of the wound roll whose diameter has increased is again taken by the cross direction camera in the same field of view, and the cross direction roll diameter after the certain period of time or after the certain number of rotations is obtained by the cross direction image processing equipment based on the images obtained. From the reference value and from the cross direction roll diameter after the certain period of time or after the certain number of rotations, the increase in the cross direction roll diameter in that certain period of time or in that certain number of rotations can be obtained at once over the whole width.

In the system for measuring the thickness of long sheet material according to the present invention, preferably the position of the reel drum is fixed, and the reel spool is movable relative to the reel drum in the machine direction in accordance with the increase in the roll diameter, and i) the roll diameter measurement equipment includes:

machine direction distance measurement equipment that includes a machine direction camera configured to take an image of an end surface of the reel spool during rotation, and machine direction image processing equipment configured to measure the amount of movement in the machine direction of the end surface of the reel spool based on the image taken by the machine direction camera; and cross direction roll diameter measurement equipment that includes a line laser light source disposed so as to irradiate the surface of the wound roll with line laser light having length in the cross direction of the wound roll, a cross direction camera configured to take an image of the line laser light irradiated on the surface of the wound roll from the line laser light source from a different angle than the direction of irradiation, and cross direction image processing equipment configured to measure the amount of increase in the cross direction roll diameter of the wound roll based on the line laser light images taken by the cross direction camera, and, ii) the system for measuring the thickness of long sheet material further includes a drive device configured to move the machine direction distance measurement equipment and the cross direction roll diameter measurement equipment in a synchronized manner.

The drive device is capable of appropriately sliding the machine direction distance measurement equipment and the cross direction roll diameter measurement equipment in a synchronized manner in accordance with the increase in the roll diameter of the wound roll (the movement of the reel spool in the machine direction). In this way the thickness in the machine direction and the cross direction of the long sheet material can be simultaneously measured, so higher accuracy profile mapping can be carried out compared with conventional scanning, and the positions of the end surface of the imaging target reel spool and the surface of the wound roll can be controlled so that they are always in the ideal position within the field of view of each camera, and the accuracy of the measurement values is improved.

Advantageous Effects of Invention

According to the method of measuring the thickness of long sheet material of the present invention,
a) It is possible to confirm the high-speed fluctuations of paper machines, improve controllability, and control the elimination of causes of problems that were difficult with conventional measurement methods, by measurement of paper thickness quality that does not use scanning and does not use filtering.
b) In this way productivity is improved, and energy and labor savings are achieved. Also reel turn up can be carried out with accurate control of length, and wasted paper can be reduced by several hundred meters per wound roll.
c) It can replace a β-ray basis weight sensor, and can be introduced in fields of heavy board paper, specialty paper, and thin paper such as tissue, toilet paper, and so on where conventional measurement control was difficult to be introduced, and thus operation management in manufacturing sites, where conventionally sensuous operation was performed, can be realized.
d) By adding it to an existing measurement control system, caliper measurement can be carried out without causing surface damage to the paper, thickness/basis weight conversion control and so on that conventionally were not possible are enabled, and together with length measurement a large economic effect can be obtained.

BRIEF DESCRIPTION OF DRAWINGS

FIGS. 7A, 7B, 7C and 7D are explanatory views illustrating the measurement principle of the spool center mark 110:
FIG. 7A is a side view of the reel spool 16,
FIG. 7B shows images 121 to 132 of the spool center mark 110 taken multiple times,
FIG. 7C is an enlarged view of an assembly 140 of the multiple spool mark images 121 to 132,
and FIG. 7D shows the centroid position 142 of each of the images 121 to 132 and the average position 144.
FIG. 8A schematically shows the cross direction roll diameter measurement equipment 200,
FIG. 8B is a side view showing the relationship between the cross direction sensor 220, the line laser light source 230, the measurement target wound roll R, and the field of view 240 of the sensor 220,
and FIG. 8C is a front view showing the relationship between the cross direction sensor 220, the line laser light source 230, the field of view 240 of the sensor 220, and the line laser light 250.
FIG. 13A is a graph showing the relationship between the number of rotations and the perimeter length,
and FIG. 13B is a side view of the wound roll R.

DESCRIPTION OF EMBODIMENTS

Figure 1:
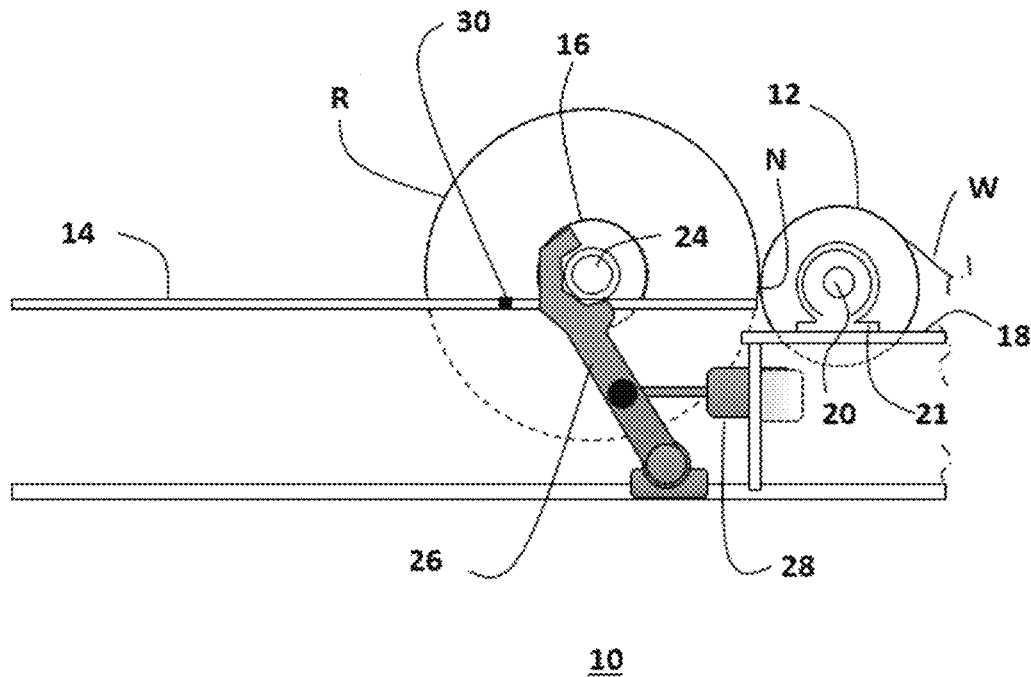
FIG. 1 is a side view schematically showing a winder 10 of a paper machine to which the present invention is applied, showing the state during normal winding.

The following is a detailed description of an embodiment of the system for measuring the thickness of long sheet material according to the present invention, with reference to the drawings. Note that in the drawings, the same elements are given the same reference sign, and parts that are not related to the present invention have been omitted.

First, the winding process which is the process to which the thickness measurement system according to the current invention is applied is described. FIG. 1 to FIG. 4 schematically show the winding process in a paper machine (not shown on the drawings), and a paper web W is used as the long sheet material. However, the present invention can be widely applied not only to paper webs, but also to other long sheet material that can be wound into a roll, such as plastic film, nonwoven fabric or metal, and so on. There are processes in which sufficient economic effect can be obtained with only the machine direction distance measurement equipment that is used for measuring the thickness in the machine direction, and it can also be applied to downstream processes that do not require thickness measurement in the cross direction, and also conversely to control for minimizing wasted paper in reel spool paying out operations.

As shown in FIG. 1, in a winder 10 of a paper machine, a shaft 20 of a reel drum 12 is rotatably supported by a bearing 21 fixed on a cradle 18, and a shaft 24 of a reel spool 16 moves on a rail 14 while being rotatably supported by a secondary arm 26. During normal operation a paper web W is wound onto the reel spool 16 to form the wound roll R while being subjected to sufficient line pressure at a nip N between the reel drum 12 and the wound roll R. In a high-speed paper machine, when the roll diameter of the wound roll R is as small as the reel spool 16, there are as many as 10 rotations in 1 second, but when it has wound to the maximum diameter (referred to as a jumbo roll) this drops to 2 rotations or fewer per second. The wound roll R is pressed against the reel drum 12 by the secondary arm 26 in combination with a hydraulic cylinder 28, and as the roll diameter increases the wound roll R moves in the machine direction (the direction away from the reel drum 12, direction normal to the cross direction of the paper web) on the rail 14. The shaft 24 of the reel spool 16 rotates, and is the subject of measurement of the system 300 according to the present invention.

Figure 2:
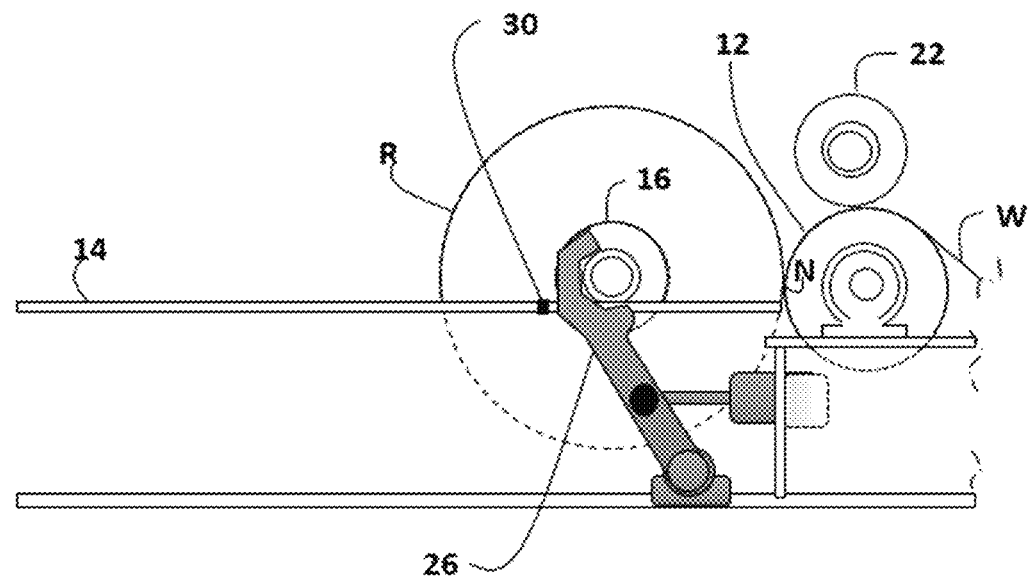
FIG. 2 shows the preparation stage for reel turn up in the winder 10, showing the state in which the reel spool 22 that will become the next wound roll R2 shown in FIG. 4 is lowered onto the reel drum 12.

FIG. 2 shows the winder 10 immediately before reel turn up (replacement of the reel spool), with the next reel spool 22 in close contact with the reel drum 12 while being supported by a primary arm that is not shown on the drawings, so that it rotates at the same speed, in preparation for reel turn up. The operator cuts the paper web W at the time of reel turn up. Conventionally, the operator carries out reel turn up visually at the timing that the edge of the secondary arm 26 overlaps with a reel turn up target mark 30 on the rail 14. However, the errors associated with this visual operation as described above are large, so in the system 300 according to the present invention the length of the manufactured paper web W is measured to determine the timing of reel turn up (described in detail later).

Figure 3:
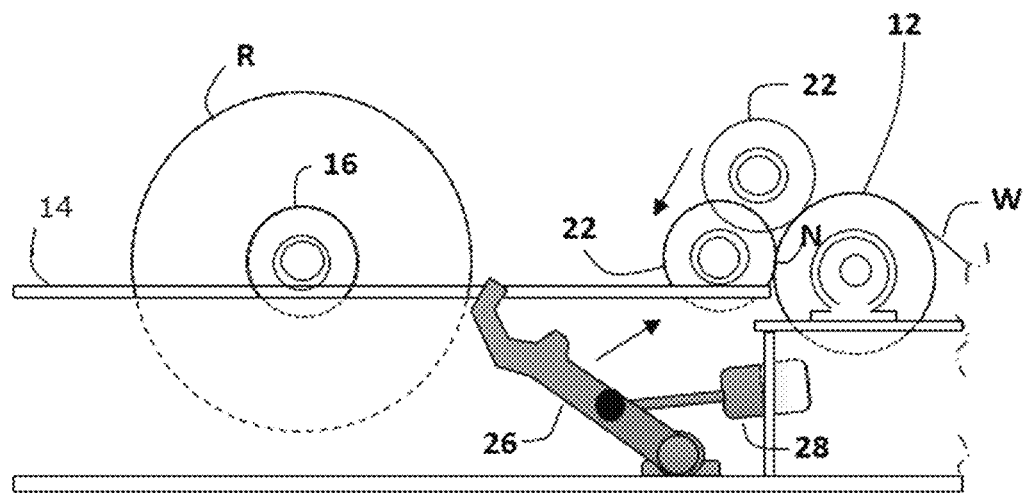
FIG. 3 shows the state immediately after reel turn up in the winder 10, in which the wound reel spool 16 has been released from the secondary arm 26, and the next reel spool 22 has been lowered onto the rail 14 and is waiting to be supported by the secondary arm 26.

FIG. 3 shows the winder 10 immediately after reel turn up. The paper web W is wound on to the next reel spool 22, and is lowered onto the rail 14 after the separated wound roll R has been released from the secondary arm 26 and has been rolled backwards (in the machine direction). This requires several seconds, and the reel spool 22 is still not in the field of view of a machine direction sensor 104 of the machine direction distance measurement equipment 100 that is described later.

Figure 4:
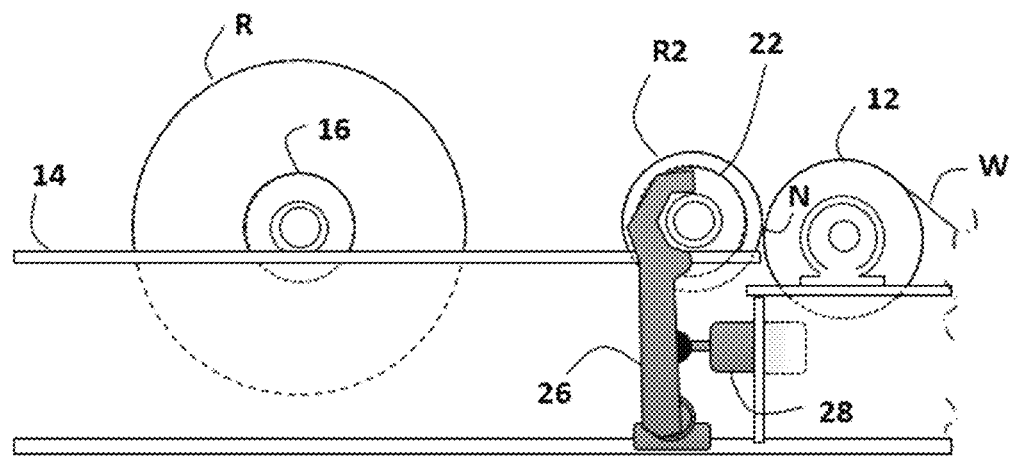
FIG. 4 shows the normal state in the winder 10 in which the secondary arm 26 is completely supporting the next reel spool 22.

FIG. 4 shows the winder 10 after reel turn up, in which the reel spool 22 is held by the secondary arm 26 after the reel spool 22 has been lowered onto the rail 14 and is in the normal state for forming a wound roll R2. Note that the primary arm that is not shown on the drawings has returned to its original position.

Figure 5:
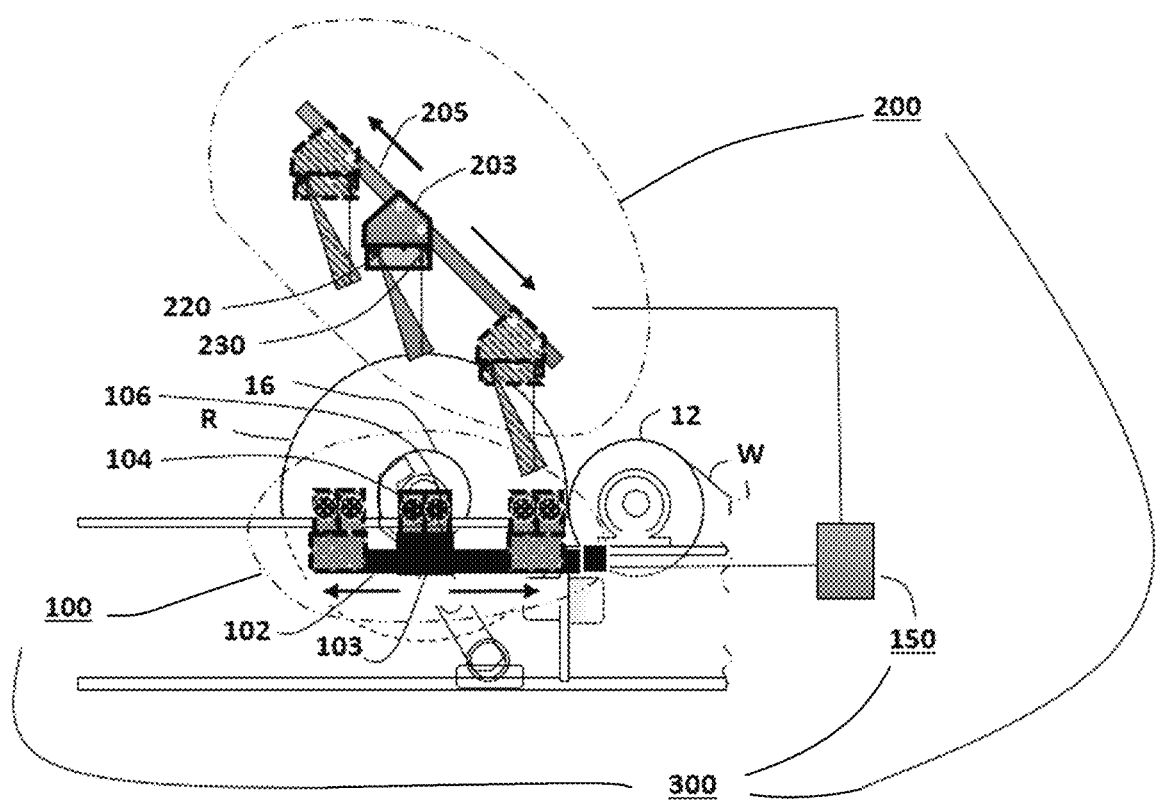
FIG. 5 is a side view schematically showing the system for measuring the thickness of long sheet material 300 according to the present invention.

The thickness measurement system 300 according to the present invention is installed on the winder 10 of the paper machine as described above, and among the series of operational procedures the thickness of the paper web W in the machine direction and the thickness in the cross direction (profile) and the manufactured length are measured. FIG. 5 shows each item of equipment of the non-scanning type separate cross direction and machine direction thickness measurement system 300 according to the present invention, schematically showing the machine direction distance measurement equipment 100, cross direction roll diameter measurement equipment 200, and measurement and control equipment 150.

Figure 6:
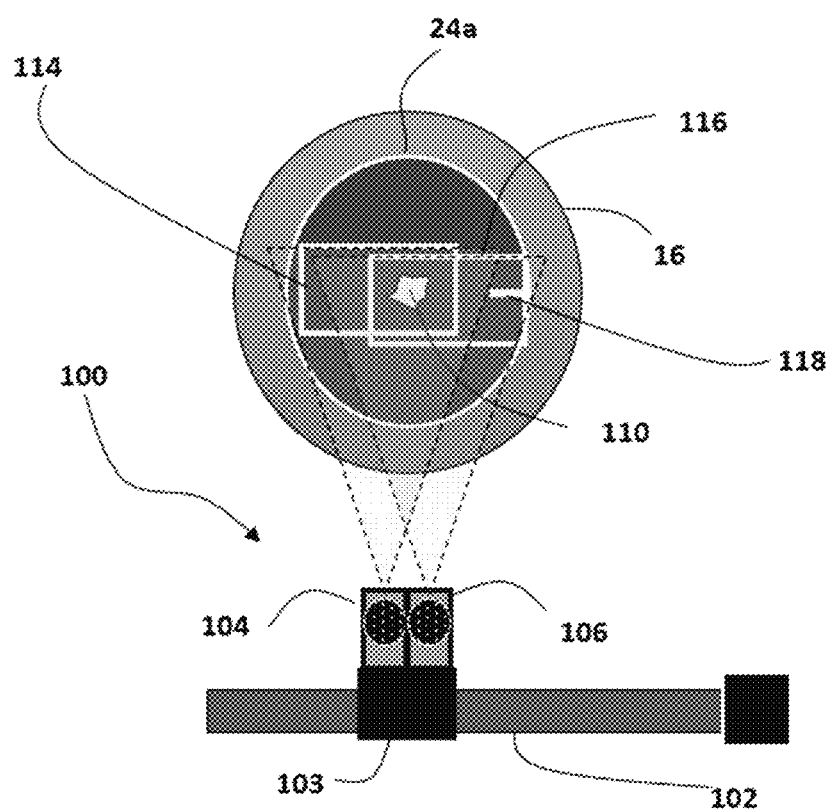
FIG. 6 is a side view schematically showing the machine direction distance measurement equipment 100 according to the present invention.

The machine direction distance measurement equipment 100 enclosed by the chain double-dashed line in the bottom part of FIG. 5 includes a machine direction sensor 104 installed on a carriage 103 of a drive device 102. The machine direction sensor 104 measures the amount of movement in the machine direction of the center of the shaft 24 of the reel spool 16 (i.e., the increase in the roll diameter of the wound roll R), and includes a machine direction camera that has a function of taking an image of a spool center mark 110 set in advance in the center of an end surface 24a of the shaft 24 of the reel spool 16, as illustrated in FIG. 6, and machine direction image processing equipment having the function of processing the images taken (neither of which are shown on the drawings). A rotation measurement sensor 106 is also installed on the carriage 103. The rotation measurement sensor 106 measures the number of rotations of the reel spool 16, and includes a rotation measurement camera having the function of taking images of a spool rotation mark 118 (see FIG. 6) set in advance on the edge of the end surface 24a of the shaft 24 of the reel spool 16, and rotation image processing equipment having the function of processing the images taken (neither of which are shown on the drawings). The drive device 102 moves the machine direction sensor 104 and the rotation measurement sensor 106 installed on the carriage 103 so as to track the end surface 24a of the shaft 24 of the reel spool 16 as the roll diameter increases. The reason that 2 cameras are used here is because in a high-speed paper machine where one rotation is 0.1 seconds or less, with the current camera image processing capability, it is difficult to carry out processing of a sufficient number of images with one camera for measurement of both the number of rotations and the center position, however with a low-speed paper machine both measurements can be carried out with one camera, so either one camera or two cameras are required to perform the necessary items for the present invention, and in this detailed description it is assumed that the configuration has two cameras. Also, even with one camera, if the number of images taken and the number of images processed is reduced, it is possible to obtain a certain level of result even with a high-speed paper machine, although the accuracy will be reduced. So with the two camera configuration, both cameras can have a backup function when there is a breakdown on either one of these cameras. The provision of the function of redundancy of measurement is also a part of the present invention.

Figure 8:
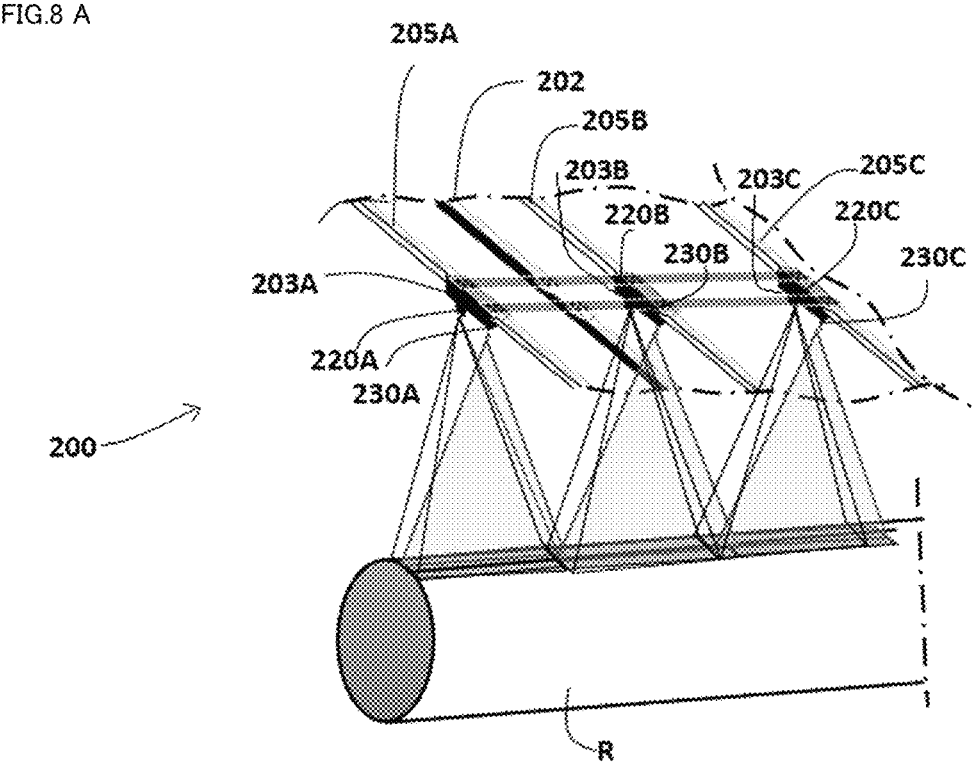
FIG. 8A to FIG. 8C schematically show the cross direction roll diameter measurement equipment 200 according to the present invention.
Figure 8:
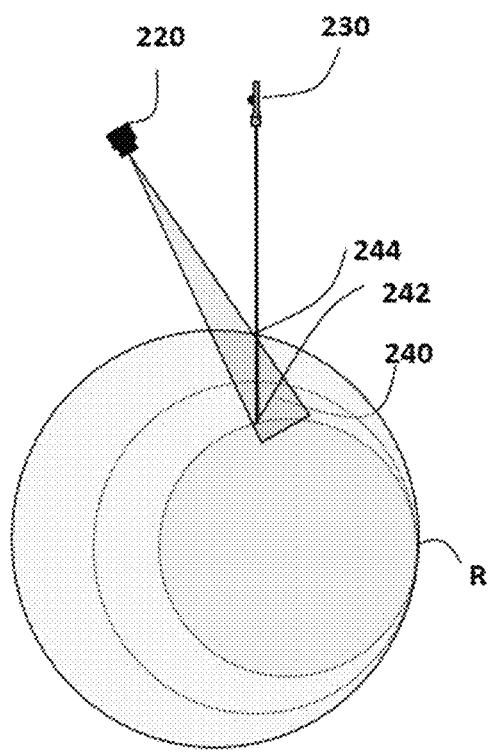
Figure 8:
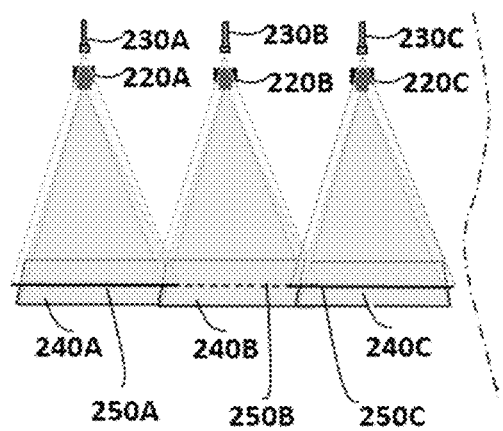

The cross direction roll diameter measurement equipment 200 enclosed by the chain double-dashed line in the upper part of FIG. 5 has a combination of a line laser light source 230, a cross direction sensor 220, and the measurement and control equipment 150, and if necessary in order to cover the complete width of the paper web W, multiple sets (3 sets in FIG. 8A) is disposed at equal intervals. The cross direction sensor 220 includes a cross direction camera (CCD camera) having the function of taking images of line laser light 250 emitted from the line laser light source 230 and that irradiates the surface of the wound roll R from a direction that is different from the angle of irradiation, and cross direction image processing equipment having the function of processing the images taken (none of which are shown on the drawings). FIG. 5 is a schematic view of the cross direction roll diameter measurement equipment 200 viewed from the side thereof, and shows that as the roll diameter of the wound roll R increases, the line laser light source 230 and the cross direction sensor 220 move upwards at an angle of 45 degrees. In FIG. 5 an image is shown in which the carriage 203 on which a set including one light source 230 and camera 220 is mounted moves, but actually three sets are connected in the cross direction of the paper web W as shown in FIG. 8A for example, and each carriage 203A to 203C is supported by their respective linear rails 205A to 205C. They are driven by a drive device 202 separately disposed in substantially the center in the cross direction, provided every 2-3 m width of the paper machine.

The measurement and control equipment 150 connected to the machine direction distance measurement equipment 100 and the cross direction roll diameter measurement equipment 200 is a device that synchronizes the movement of the machine direction sensor 104, the line laser light source 230, the cross direction sensor 220, and the rotation measurement sensor 106, as well as carrying out processes such as collection of measurement data, displaying data, controlling data, generating and storing analysis data, and so on. Calculations are carried out based on the increase in roll diameter and number of rotations of the reel spool and so on measured by each of the sensors 104, 106, 220, from which the thickness and length of the paper can be obtained. With the combination of the machine direction distance measurement equipment 100, the rotation measurement sensor 106, and the measurement and control equipment 150, a thickness measurement system for the machine direction alone can be constructed, and the combination of the cross direction roll diameter measurement equipment 200 and the measurement and control equipment 150 can be used as a simple profile gauge, and these are also included in the present invention.

Next, a method of measurement of the thickness of the paper web W using the thickness measurement system 300 as described above will be described. First, the method of measurement using the machine direction distance measurement equipment 100 will be described, and this uses a method of measurement of the movement of the reel spool 16. In other words, the amount of increase of the average value of the roll diameter of the wound roll R in the cross direction measured while the reel drum 12 applying sufficient linear pressure within a certain period of time can be used to represent the amount of movement in the machine direction of the reel spool 16. Thickness measurement of the paper web W subjected to the linear pressure applied by the reel drum 12 and the secondary arm 26 complies with the method of measurement defined for the thickness of paper (referred to as caliper) in the Technical Association of the Pulp & Paper Industry (TAPPI) standard (caliper is the thickness of paper when subjected to a pressure of 50 kPa), and moreover averaging is carried out over the whole width, so the conditions are appropriate for the caliper in the machine direction. The amount of change in thickness is expressed as a measurement value such as weighted average, moving average, simple average, and so on, in accordance with the purpose. The measurement accuracy for the amount of movement measured by the machine direction sensor 104 is set to be 50μ or better. With a stack of 50 sheets this value represents an error of 1μ or less, and if the thickness of the paper is 100μ the error is 1%, and if the thickness is 50μ the error is 2%. These measurement values can be obtained in a few seconds when the roll diameter is small immediately after reel turn up, and in several tens of seconds when the roll diameter is large immediately before reel turn up of the so-called jumbo reel. When converting to thickness, if the number of sheets is increased the accuracy is further improved.

FIG. 6 shows the spool center mark 110 and spool rotation mark 118 provided on the end surface 24*a* of the shaft 24 of the reel spool 16, and fields of view 114, 116 of the machine direction sensor 104 and the rotation measurement sensor 106 that take images of these marks 110, 118. It is a characteristic of the present invention that measurement is carried out using images, but as a result of the combination of the speed of the paper machine and downstream processes, more than 10 or up to several tens of reel spools are prepared, and problems of disfiguration and the like occur. This is because it is not possible to apply the same shape of mark to all spools and the mark becomes deteriorated or dirty with time and due to handling problems. So it is reasonable to consider that the images of these marks obtained are constantly changing. Therefore, there are many uncertain factors other than approximate position of the mark, and all these factors should be eliminated as they can be considered to be external disturbances in terms of measurement. External disturbance factors can include vibrations due to the specific bearings of each reel spool or the like, circularity, and so on, apart from the external appearance of the mark.

The rotation measurement sensor 106 takes 30 or more images of the range for capturing images of the spool rotation mark 118 during one rotation of the reel spool 16, in order to reliably detect the mark 118 within a field of view 116 of size 5 cm×10 cm to 10 cm×20 cm. The spool rotation mark 118 is painted with a gap of about 5 cm from the spool center mark 110, and even assuming the field of view 116 is small at 5 cm×10 cm, it can cover ⅙th or more of the range of movement of the mark 118 when mark 118 is rotated once, so there will be at least 5 opportunities for detection while the mark 118 is passing through the field of view 116, so the mark will not be missed.

The machine direction sensor 104 takes at least 30 images of the spool center mark 110 in the field of view 114 while the reel spool 16 makes one rotation, so external disturbances can be eliminated by synthesis or averaging the resulting images. Thirty measurements is the number of images acquired on a currently fastest machine, and for normal machine speeds (1000 m or less/min) images can be acquired from 50 to 100 times. In order to maintain the spool center mark 110 appropriately within the field of view, the carriage 103 (the machine direction sensor 104 and the rotation measurement sensor 106) is moved by the drive device 102 for every 3 cm to 5 cm movement, in accordance with the image results and calculations of time, thickness, movement speed, and so on. They show relevant movement as the roll diameter of the wound roll R increases.

The following is an explanation of the principle of measurement of the spool center mark 110 as described above, based on FIG. 7A to FIG. 7D. As shown in FIG. 7A, the spool center mark 110 is substantially a circular shape painted on the center of the end surface 24*a* of the shaft 24, and the circularity will deteriorate with passage of time and with soiling, as described above. Also in some cases a part be missing or some paint that deviates from the center may remain, and the situation will differ in each individual reel spool. An important means of the present invention is to take many measurements of these deteriorated marks and measured their centroid to obtain their average value. FIG. 7B shows an example where 12 measurements are taken, once every 30 degrees, for ease of understanding, but actually 30 or more measurements are taken. FIG. 7B to FIG. 7D show the process of obtaining the measurement of the position of the center of the reel spool 16 by acquiring mark images 121 to 132. A centroid assembly 142 (FIG. 7D) is measured for each image of an assembly 140 (FIG. 7C) of the 12 mark images 121 to 132 (FIG. 7B) that have been acquired, and by obtaining an average value 144 thereof, the position of the center of the spool can be measured to high accuracy. Besides this method of individual image processing, the same result can be obtained from a method of combining all the image results and obtaining their centroid, and these means also form the framework of the present invention. Both methods can also be applied to measurement of the cross direction roll diameter as described later, and which method to use can be determined from which has the better calculation speed or measurement speed. Incidentally the method of averaging after obtaining each centroid has the advantage that it can remove illegal images, but image processing speed is required. This method of averaging cancels out individual differences between spools due to such as vibrations by bearings, circularity, and so on, so high accuracy center position measurement is enabled. Measurement is carried out within 1 second, so changes in the shape of the mark during that time can be ignored in practice, but as stated previously it is possible to detect abnormal marks by the methods of averaging after measuring the centroid positions individually.

The advantage of measurement using images that forms the framework of the present invention is that the individual differences between multiple reel spools can be eliminated because multiple points can be measured so there is no dependence on the accuracy of the external appearance of the mark to be measured or the accuracy of its position. Therefore accuracy that is significantly better compared with methods using mechanical strain gauge or distance measurement can be achieved. Also, even if the pixel resolution of the camera of the sensor 104 is 50μ, by taking multiple points the bi-pixel interpolation method can be used and calculation of accuracy down to the pixel size or smaller can be obtained.

Next, the method of measurement of the cross direction roll diameter is described based on FIG. 8A to FIG. 8C and FIG. 9A and FIG. 9B. FIG. 8A schematically shows the cross direction roll diameter measurement equipment 200; FIG. 8B is a side view showing the relationship between the cross direction sensor 220, the line laser light source 230, the measurement target wound roll R, and the field of view 240 of the sensor 220; and FIG. 8C is a front view showing the relationship between the cross direction sensor 220, the line laser light source 230, the field of view 240 of the sensor 220, and the line laser light 250.

Using the cross direction sensor 220 and the line laser light source 230, the cross direction roll diameter of the wound roll R after application of sufficient linear pressure is measured as height. The cross direction sensor 220 includes the cross direction camera and a processing function for the images taken by the camera. In this case the absolute value of the measurement value is not used as the height, but first the cross direction sensor 220 and the line laser light source 230 are moved to the position irradiated by the line laser light 250 directly above the center of the shaft of the reel spool 16, and a first measurement is performed. This is used as the reference value, and the difference between subsequently measured heights and this reference value is measured as the increase in the roll diameter, and divided by the number of rotations during this period of time to obtain the cross direction thickness profile of the paper web W. Measurements are carried out at about 200μ to 300μ intervals in the cross direction, and the maximum field of view of the measurement cameras is about 400 mm to 600 mm, but these numerical values are designed corresponding to the process in accordance with the space on site, camera capacity, laser light source specification, and so on. Height measurements are taken at multiple points periodically (for example every 10 times of rotation) during one rotation of the reel spool 16. The measurement range is a linear band, so the area ratio within the field of view of the camera is extremely small. Therefore, by using a technique in which at the commencement of measurement the area to be measured is determined and subsequently during height measurement the image processing method is carried out on that area only, high-speed image taking and averaging can be carried out, so that sufficient averaging is carried out and the natural vibrations of the wound roll R and so on are canceled out.

The rotation measurement sensor 106 triggers the commencement and completion of this one rotation, and this trigger is passed via the measurement and control equipment 150 to the cross direction roll diameter measurement equipment 200 disposed above the wound roll R, and is also the trigger for measurement of the spool center mark 110 by the machine direction distance measurement equipment 100. The measurement and control equipment 150 also carries out synchronization when calculating correction coefficients for the acquisition positions of the reference values that are the reference for measurement (profile at time zero) and of the subsequent height measurement values, and for the spool center positions.

The three cross direction sensors 220A, B, and C and the three line laser light sources 230A, B, and C are disposed with the same spacing in the cross direction (for example 50 cm), and the cross direction sensors 220 focuses so that the field of view is 50 cm at a set distance above the wound roll R. The laser light source 230 is focused to 50 cm at the same set distance. At this time, a region within ±several centimeters of the set distance (height) is a region within the focal depth of the camera, a region in which good images can be taken, and a region used for height measurement. These numerical values vary depending on the camera, the lenses, and so on, so they are not defined. What is important is that as the height of the wound roll R changes, the position of the linear image of the laser light 250 taken within the field of vision of the camera varies as indicated by 262, 264, and 266 in FIG. 9A. In the present invention, the accuracy in height at this time of is set at least 100μ or better. The cross direction sensor 220A and the laser light source 230A are installed on the linear rail 205A via the carriage 203A, and moved integrally. The other cross direction sensors 220B and C and laser light sources 230B and C are likewise combined as pairs, and are installed on the linear rails 205B and C via their respective carriages 203B and C, and when they move their movements are all synchronized. The drive device 202 is provided as means for moving them, and the movements are synchronized with the drive device 102 of the machine direction distance measurement equipment 100.

The cross direction sensor 220 faces the surface of the wound roll R as shown in FIG. 8B, and the field of view is indicated as 240. The point of irradiation 242 of the line laser light source 230 indicates the minimum height in the range of height measurement, and the point of irradiation 244 indicates the maximum height. Within this region, the measurement and control equipment 150 moves the cross direction sensor 220 and the line laser light source 230 in parallel and simultaneously via the drive device 202.

When the cross direction roll diameter measurement equipment 200 is viewed from the front, the positional relationship of the line laser light sources 230A, B, and C and the cross direction sensors 220A, B, and C and their fields of view 240A, B, and C are as shown in FIG. 8C. During actual operation the irradiated line laser light 250 A, B, and C overlap, so in order to carry out processing, A and B as well as B and C are not irradiated at the same time. The line laser light 250 over the cross direction is always alternately irradiated on both sides. The cross direction sensor 220 also carries out measurement synchronized with this alternating irradiation.

Figure 9:
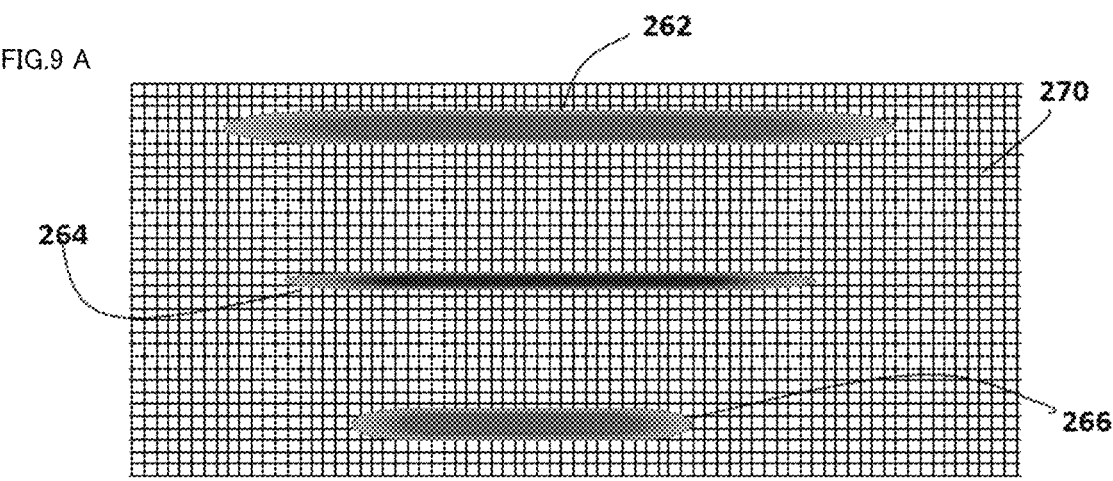
FIG. 9A and FIG. 9B show the position within the field of view of the line laser light 250 in the CCD area 270 of the cross direction sensor 220, and the images taken.
Figure 9:
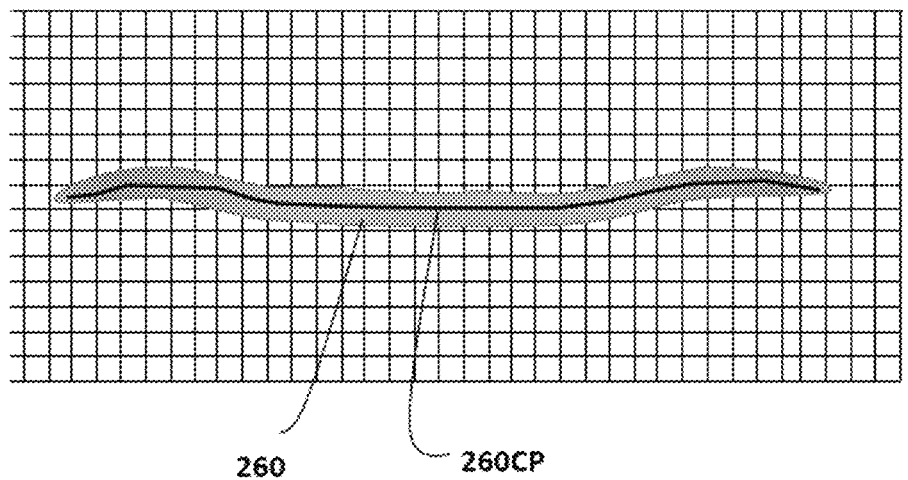

FIG. 9A and FIG. 9B show the concept of measurement of the height (roll diameter) by image processing of the line laser light 250. The cross direction sensor 220 uses a CCD camera. When the height of the wound roll R is low (when the distance between the wound roll R and the camera (sensor 220) is far), the image of the line laser light 250 appears as a slightly blurred thick and long image as indicated by the image 262 in FIG. 9A on the upper side in the field of view 270 of the CCD camera. The image 264 is a sharp image at the set focused central position and has a length that is shorter than that of the image 262, and the height is exactly in the middle. When the roll diameter increases and the distance to the camera becomes shorter, the image 266 appears on the lower side in the field of view 270, and the resulting image is thicker as it has shifted out of focus and the length is shorter as it is closer to the camera. The positions and grayscale values of each pixel within the field of view are used for conversion to height, and several tens to several hundreds of data for the conversion are measured during one rotation of the reel spool 16 from start of measurement. The more points measured the finer the noise that can be eliminated. Averaging of the measurement values is carried out in the same way as for the measurement of the spool center mark measured in the machine direction, by superimposing the images taken and averaging the centroid positions of respective cross direction pixel sections. When there is irregularity in the height in the cross direction and the cross direction sensor 220 deviates from the focused central position, the image taken of the line laser light 250 deviates from a linear shape, as indicated by 260 in FIG. 9B. In this case also the centroid positions of respective cross direction pixel sections are averaged to obtain the height measurement values 260CP.

This measurement value is simply a height measurement value, and as it is it is not the thickness of the paper web. The thickness is calculated by the following procedure.

1)
The position of the center of the wound roll R is measured by the machine direction distance measurement equipment 100, and the cross direction roll diameter measurement equipment 200 is moved so that the laser irradiation thereof is slightly forward of the center position (for example 2-3 mm forwards downstream in the machine direction).

2)
When the central shaft of the reel spool 16 reaches the position of the laser irradiation, the reference cross direction height is measured, and saved and stored in the measurement and control equipment 150.

3)
Next, when the reel spool 16 has made a predetermined number of rotations or movement distance, the rotation measurement sensor 106 or the machine direction sensor 104 outputs a trigger, and the cross direction sensor 220 measures the height, and saves and stores it in the measurement and control equipment 150.

4)
The measurement and control equipment 150 performs a calculation to correct the height using the measured values of the height and the amount of movement during the period of time, and calculates the thickness of one sheet of the paper web by dividing by the number of rotations during that period of time.

5)
Thereafter 3) and 4) are repeated until the line laser light 250 is outside the field of view 240 and the cross direction sensor 220 and the line laser light source 230 are moved again.

Figure 10:
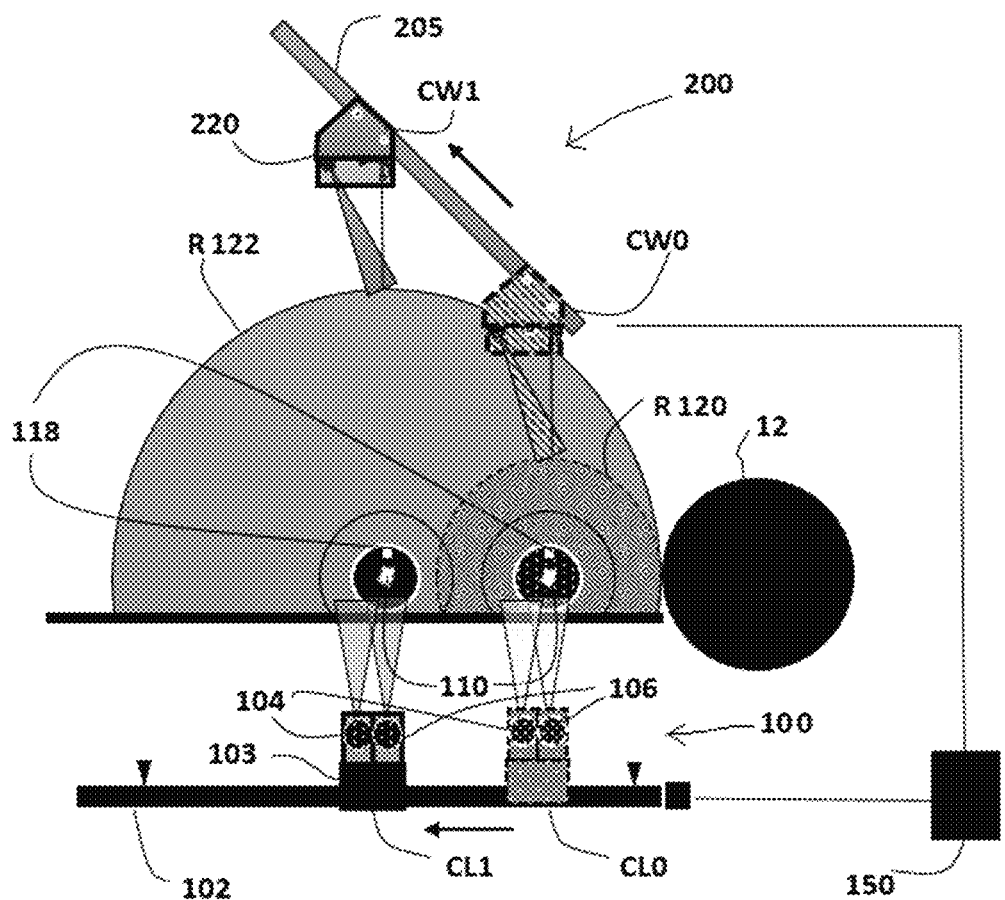
FIG. 10 illustrates the concept of synchronized movement of the machine direction distance measurement equipment 100 and the cross direction roll diameter measurement equipment 200.

FIG. 10 illustrates the concept of synchronous movement between the machine direction sensor 104 of the machine direction distance measurement equipment 100 and the cross direction sensor 220 of the cross direction roll diameter measurement equipment 200. The number of rotations and the position of the center of the reel spool of the wound roll R are measured at the sensor position CL0 by the machine direction sensor 104 and the rotation measurement sensor 106. At this time the cross direction sensor 220 is at the sensor position CW0, and measures the height in the cross direction of the wound roll R with the roll diameter in the state R120. Both the machine direction sensor 104 and the cross direction sensor 220 are moved in accordance with the increase in the roll radius r (state R122) in order to ensure the field of view of the image to be taken, and at that time the cross direction sensor 220 are moved simultaneously with the machine direction sensor 104 slightly forward of the position of the center of the reel spool 16 (towards the downstream side in the machine direction) (machine direction sensor position CL1 and cross direction sensor position CW1 in the drawing). The movement time is several seconds, but in order to accurately measure the cross direction roll diameter reference points, the cross direction sensor 220 is placed forward of the center position of the reel spool 16, and when the actual center position arrives directly below the laser irradiation position the machine direction sensor 104 outputs the trigger to start measurement of the height reference value. Calculation of the thickness requires measurement of the change in height but the absolute value of the height is not necessary, but this is a measure in order to maintain accuracy as much as possible.

Figure 11:
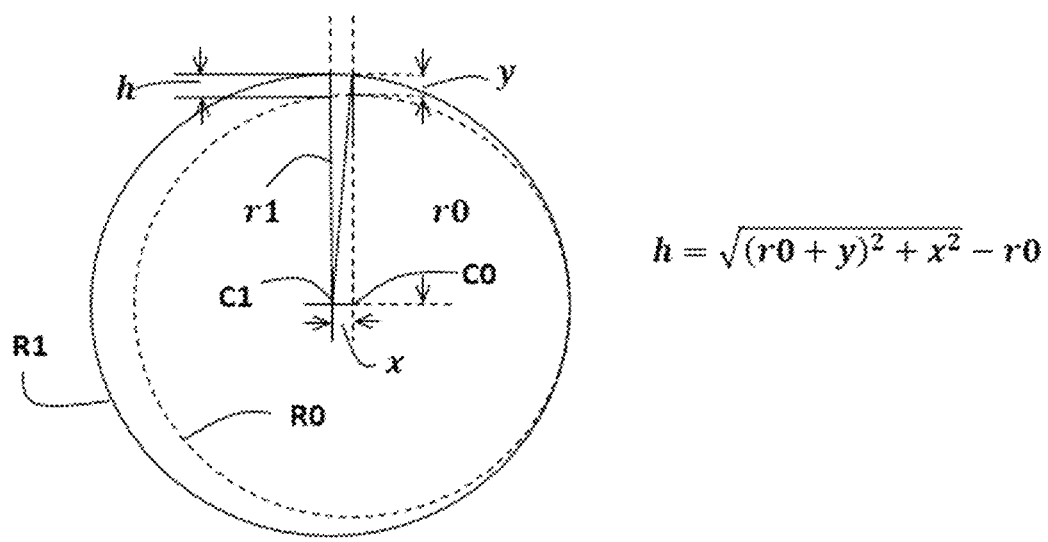
FIG. 11 illustrates the concept of correction of the cross direction sensor (reference sign 220 in FIG. 8B) and measurement of the difference.

FIG. 11 shows the method of correction when the reel spool center position is moved from the reference point as roll diameter increase. In the drawing, the wound roll R when measuring the reference value (roll diameter=r0) is indicated by the broken line circle R0, and the center thereof is indicated as C0. The wound roll R during the next measurement (roll diameter=r1) is indicated by the solid line circle R1, and the center thereof is indicated as C1. The center moves by the amount of increase of the roll diameter x (=r1−r0). At this time, the amount of increase of the average value in the cross direction of the height from the center position, h, is also equal to x. However the position measured by the cross direction sensor 220 is directly above the previous center position C0, so the measurement result for the amount of increase is measured as y, not h. The measurement value obtained is the amount of change in the cross direction height (roll diameter) for this amount of movement, and is the amount of change in the cross direction height between the reference position and the position after movement. The amount of change h is obtained as the measurement value after correction in accordance with the following equation using the radius at the reference position r0, the measurement result y, and the amount of movement in the machine direction x.

$$h=\{(r0+y)^2+x^2\}^{1/2}-r0$$

The value of h obtained here is the cross direction height after the center position of the reel spool has moved from the reference position, the average value should be a value close to x, and should be the same value if an ideal truly smooth wound roll is produced. The thickness of the paper web W is constantly varying, and therefore it is necessary to constantly monitor the height in the cross direction. On the other hand, x indicates the amount of movement in the machine direction, and difference when converted into thickness indicates the machine direction component of the average thickness value only, separated from the cross direction height.

Figure 12:
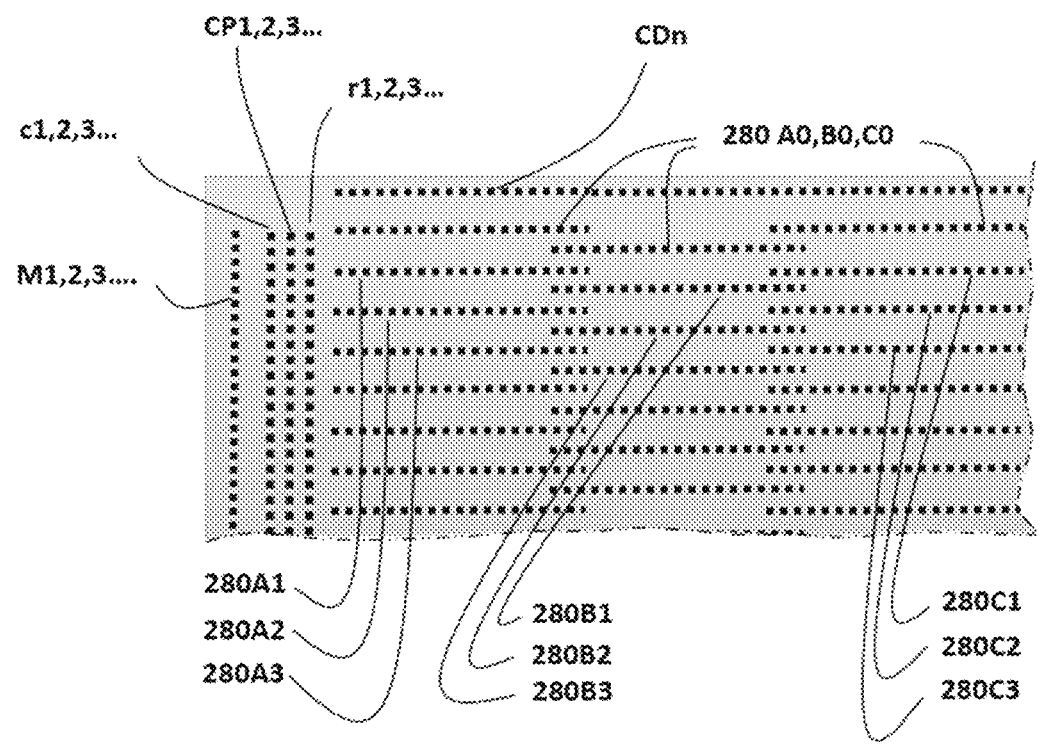
FIG. 12 illustrates the mutual synchronization relationship of the data from each item of equipment included in the thickness measurement system according to the present invention.

FIG. 12 shows an image of the data handling when performing calculations on the measurement values such as the spool center position, height, number of rotations, and so on, as described above, to obtain the target thickness and length. Measurement results from each of the sensors 104, 106, 220 are transmitted to the measurement and control equipment 150, and the data is stored as indicated in the drawing. The measurement values from the machine direction distance measurement equipment 100 are time stamped and the reel spool number of rotations M, the reel spool center position (distance from the center of the field of view of the camera) C, the camera position (distance from the reel drum) CP, and the roll diameter r obtained from the calculation results are stored as a time series. Next, as to the measurement values from the cross direction roll diameter measurement equipment 200, for each cross direction position CDn determined in the cross direction at the resolution of measurement equipment, cross direction reference heights 280A0, 280B0, 280C0 from the cross direction sensors 220 are stored in the area for the number of rotations at the time of measurement. Next, measurement values 280A1, 280B1, 280C1 for the first measurement are stored in the area for the measured number of rotations. Thereafter the system 300 continues to carry out measurements at a predetermined interval until new reference measurements are carried out. When this basic data is obtained, subsequently it is used for the necessary calculations.

It is an object of the present invention to measure the variation in the machine direction thickness and the variation in the cross direction thickness separately by high-speed thickness measurement that is not scanning measurement and that does not require filtering. In this way high speed control is enabled, and the causes of high-speed variations due to equipment of the paper machine and the like can be analyzed, which was not possible with conventional measurement, so measurement control can be carried out with the object of eliminating the causes, and not correcting the paper quality forcibly by external equipment, or carrying out corrections by identifying variation factors and eliminating them. From the measurement data shown in FIG. 12, the thickness of one sheet of the paper web W is calculated by, for example, r1=CP1+C1, r2=CP2+C2, so the amount of movement in this period of time is r2-r1, and this is divided by the number of rotations M in this period of time. When two images are taken within the same field of view, the position of the camera has not been moved so CP1=CP2. If the amount of movement is 1 mm and the number of rotations is 50, the calculation result is 200μ, and after application of correction for air content the thickness of the paper is calculated. The correction for air content varies depending on the grade of paper, the paper machine speed, the line pressure, and so on, and is a factor that is tuned on site. Likewise, the cross direction thickness is obtained by dividing 280A1-280A0 by the number of rotations in that period of time. The reference values for the machine direction measurement values and the cross direction measurement values are the same until the measurement equipment is moved, so in order to improve the accuracy the number of rotations can be freely increased, for example to obtain the average value for 150 sheets from r4-r1, 280A3-280A0, and so on. Different methods of averaging can be taken for control strategy, machine analysis, and quality control, or for representing the final state of one wound roll. Also, it is possible to construct roll shape and quality control data for daughter rolls downstream (smaller rolls of the size for sale). Weighted average or a moving average is taken for variations that are measured fastest, the thickness is converted into basis weight and can be controlled. The present invention can provide a major economic effect and improvement in quality for processes where it is not possible to employ a radiation protection officer and to introduce basis weight measurement control using a n-ray basis weight sensor.

Figure 13:
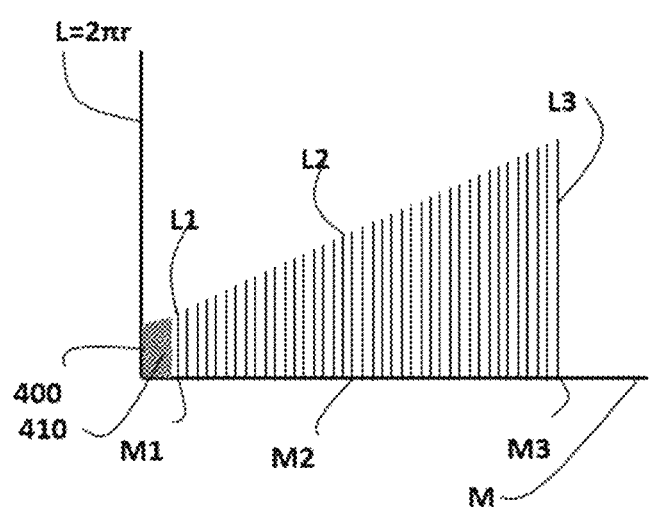
FIG. 13A and FIG. 13B show the relationship between length calculation of paper and reel turn up according to the present invention.
Figure 13:
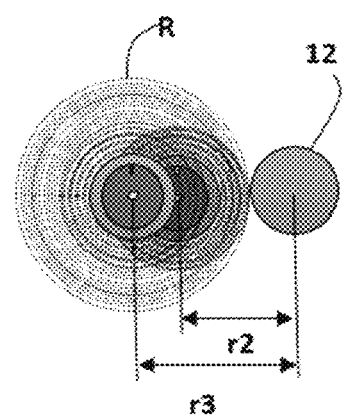
Figure 14:
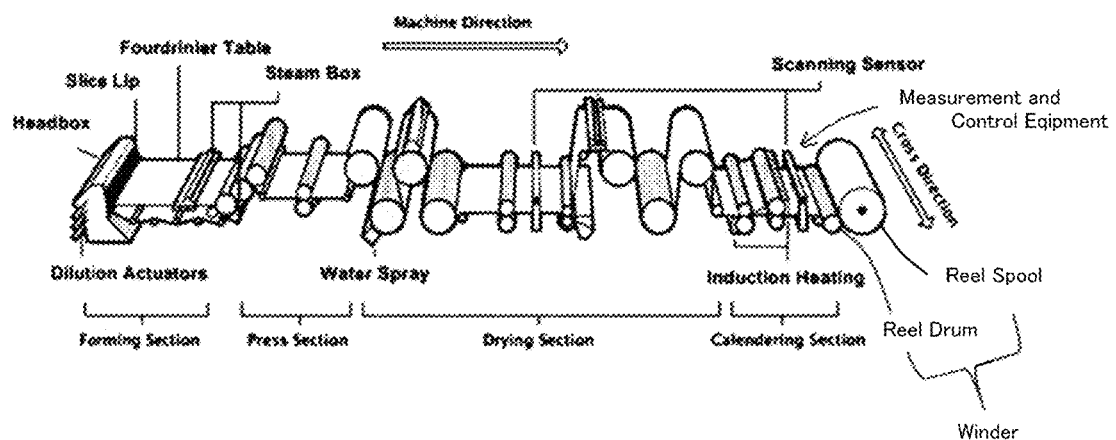
FIG. 14 is a schematic view of a paper machine equipped with a conventional scanning sensor.
Figure 15:
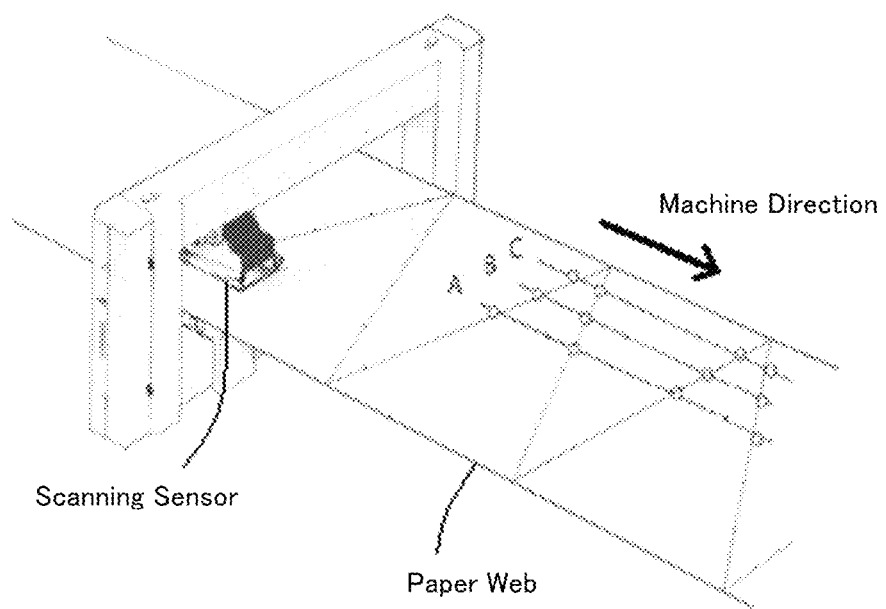
FIG. 15 illustrates the concept of measurement in the scanning system of a conventional quality control system. (From Paper Machine Quality Control Systems (QCS) Published by TAPPI Press)
Figure 16:
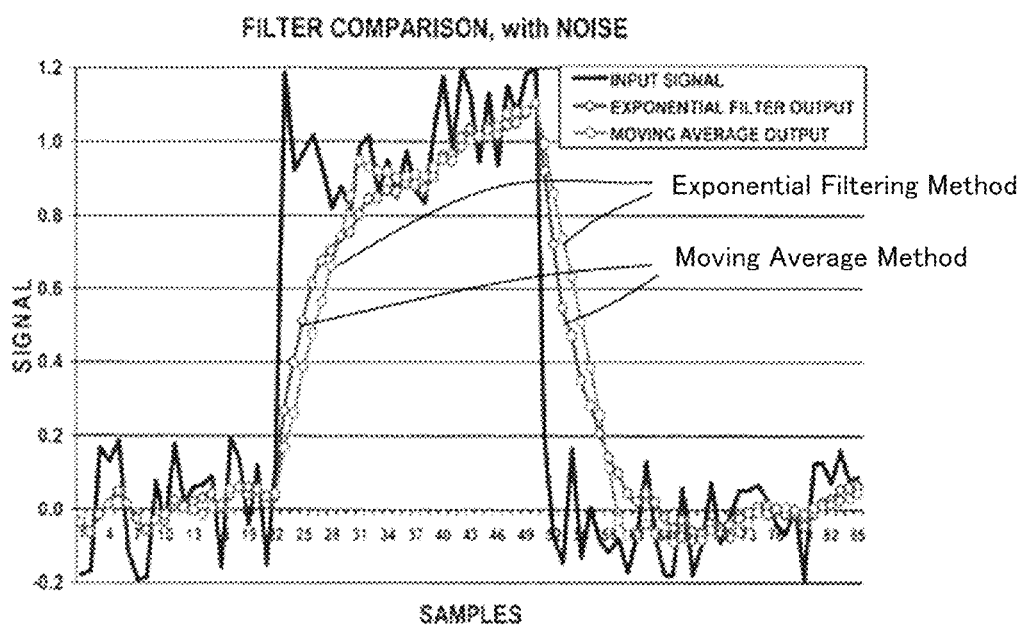
FIG. 16 is a graph showing the measurement responsiveness as a result of filtering. (Same source as above)

In addition, it is possible to measure the true length of a roll as shown in FIG. 13A and FIG. 13B, and to reduce wasted paper in downstream processes, so a major economic effect can be obtained from the machine direction distance measurement equipment only. This result is obtained by the means according to the present invention measuring the roll diameter of the wound roll and the number of rotations, and the system measures the radius of the wound roll, and at the same time records the number of rotations. In FIG. 13A and FIG. 13B, L2 and L3 are the circumferential length of the wound roll at certain times after commencement of measurement, and L2 is $2 \times \pi \times r2$, and L3 is $2 \times \pi \times r3$. The length of the paper web W in this period of time is $(L2+L3) \times (M3-M2) \div 2$, or the area of a trapezium whose top side is L2, whose bottom side is L3, and whose height is the number of rotations M. Measurement starts from M1, but there are several seconds during which measurement of the number of rotations cannot be carried out immediately after reel turn up, but this can be estimated from the results of the subsequent increase in the roll diameter, or can be calculated from the time after reel turn up at which measurement becomes possible. Assuming that this amount is indicated by 410 in the drawing and that 400 is the length of the perimeter of the reel spool, then the number of rotations in the time from reel turn up until start of measurement at M1 can be estimated from the time between M1 and M2, or the length can be obtained from the final speed of the roll immediately beforehand. The roll diameter is extremely small compared with that of a jumbo roll, so a difference of one or two rotations is only a few meters.

REFERENCE SIGNS LIST

W: Paper web (long sheet material)
R: Wound roll
N: Nip
10: Winder
12: Reel drum
14: Rail
16: Reel spool
100: Machine direction distance measurement equipment
104: Machine direction sensor
106: Rotation measurement sensor
150: Measurement and control equipment
200: Cross direction roll diameter measurement equipment
220: Cross direction sensor
300: System for measuring the thickness of long sheet material

The invention claimed is:
1. A method of measuring thickness of a long sheet material wound on to a reel spool while being pressed by a reel drum, comprising:
arranging the position of the reel drum to be fixed, and the reel spool to be movable relative to the reel drum in a machine direction in accordance with an increase in a diameter of a wound roll formed by the reel spool and the long sheet material wound on to the reel spool;
measuring the increase in the diameter of the wound roll by measuring an amount of movement in the machine direction of the center position of a shaft of the reel spool, wherein the measurement is carried out by taking, using a camera, an image of an end surface of the shaft of the reel spool during rotation of the reel spool, and by processing the image taken by the camera to determine the amount of movement of the center position of the shaft of the reel spool during the rotation;

measuring a number of rotations of the reel spool; and calculating the thickness of the long sheet material using the measured increase in the diameter of the wound roll and the number of rotations.

2. The method of measuring the thickness of long sheet material according to claim 1, further comprising:

while irradiating the surface of the wound roll with line laser light having length in a cross direction of the wound roll, taking images of the line laser light irradiated on the surface of the wound roll from a different angle than the direction of irradiation of the line laser light;

carrying out the processing based on the images of the line laser light that are taken to measure the amount of increase in a cross direction roll diameter of the wound roll; and calculating the thickness at each of a plurality of points in a cross direction of the long sheet material by using the measured increase in the diameter of the wound roll at each said point and the number of rotations.

3. The method of measuring the thickness of long sheet material according to claim 2 wherein while irradiating the surface of the wound roll with line laser light having length in the cross direction of the wound roll, taking images of the line laser light irradiated on the surface of the wound roll from a different angle than a direction of irradiation of the line laser light, and measuring the diameter of the wound roll in the cross direction based on the images of the line laser light that are taken as a reference value;

a predetermined period of time after the irradiation of the surface of the wound roll with line laser light and measuring the diameter of the wound roll in the cross direction, again irradiating the surface of the wound roll with line laser light having length in a cross direction of the wound roll, taking images of the line laser light irradiated on the surface of the wound roll from a different angle than the direction of irradiation of the line laser light, and measuring the amount of increase in a diameter of the wound roll in the cross-direction from the reference value over a whole width of the wound roll at once based on the images of the line laser light that are taken;

measuring the number of rotations of the reel spool during the course time; and calculating the thickness at each of a plurality of points in a cross direction of the long sheet material during that course time by calculation using the measured increase in the diameter of the wound roll at each said point in the cross direction from the reference value and the number of rotations.

4. The method of measuring the thickness of long sheet material according to claim 1 wherein the center position of the shaft during rotation is measured by taking multiple images of a center mark provided on the end surface of the shaft during rotation of the shaft, and processing the multiple images of the center mark to determine the centroid of the multiple images of the center mark.

* * * * *